(12) United States Patent
Frad et al.

(10) Patent No.: US 8,413,885 B2
(45) Date of Patent: Apr. 9, 2013

(54) INTERNET COMMUNITY BASED COUNTERFEIT AND GREY MARKET COMBATING METHOD

(76) Inventors: Adel Frad, Braunschweig (DE); Marco Lallemand, Burgdorf (DE); Senthilkumar Vellaichamy, Hannover (DE)

( * ) Notice: Subject to any disclaimer, the term of this patent is extended or adjusted under 35 U.S.C. 154(b) by 0 days.

(21) Appl. No.: 13/455,038

(22) Filed: Apr. 24, 2012

(65) Prior Publication Data

US 2012/0205439 A1    Aug. 16, 2012

(51) Int. Cl.
*G06F 17/00* (2006.01)
(52) U.S. Cl.
USPC ............ 235/375; 235/380; 235/385; 705/52; 705/53; 705/54; 705/67; 705/78
(58) Field of Classification Search .................. 235/375, 235/380, 385; 705/50, 52–54, 67, 78; 713/176
See application file for complete search history.

(56) References Cited

U.S. PATENT DOCUMENTS

| | | | |
|---|---|---|---|
| 8,028,891 B2 | 10/2011 | Harjani | |
| 2003/0141358 A1* | 7/2003 | Hudson et al. | 235/375 |
| 2005/0144132 A1 | 6/2005 | Lin | |
| 2007/0022294 A1 | 1/2007 | Lapstun | |
| 2008/0189212 A1* | 8/2008 | Kulakowski et al. | 705/50 |
| 2011/0084130 A1 | 4/2011 | Lapstun | |
| 2011/0145053 A1 | 6/2011 | Hashim-Waris | |
| 2011/0215145 A1 | 9/2011 | Silverbrook | |

* cited by examiner

*Primary Examiner* — Daniel Hess
*Assistant Examiner* — Tabitha Chedekel
(74) *Attorney, Agent, or Firm* — CIONCA Law Group P.C.; Marin Cionca

(57) ABSTRACT

A method for combating counterfeiting and gray market is provided, the method including the steps of accessing a web platform comprising a network-connected server on which software that provides functionalities for the method executes, generating a unique identifier ("UID") for every product unit being produced by a manufacturer, saving the UID in a database that is part of the web platform, communicating the UID to the manufacturer, associating the UID with a product unit such that the UID is hidden; verifying the authenticity of the UID, and, sending a message from the web platform indicating whether or not the verified UID is authentic.

20 Claims, 9 Drawing Sheets

Cont'd on Sheet 3

Owner 1 (first one who bought from manufacturer):
<User name of Owner 1 in the platform>
<Sales time and location from retailer>

Owner 2:
<User name of Owner 1 in the platform>
<Sales time from Owner 1>
...

Actual Owner (Owner n):
<User name of Owner n in the platform>
<Sales time and location from Owner n-1 >

Product:
<model>
<Pictures>
<Production time and location>

<UID (Clear Text)>

INTERNET COMMUNITY BASED COUNTERFEIT AND GREY MARKET COMBATING METHOD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates generally to computer based systems and processes and particularly to counterfeit and grey market combating systems and processes.

2. Description of the Related Art

International markets are flooded more and more with grey market and faked brands and products. They threaten especially well established companies with research extensive products. The distribution by malfeasants of the fake and grey market products have many negative impacts on these established companies, ranging from reduced revenues, margin erosion, loss of reputation to negative brand image, service and warranty problems and reduced customer satisfaction. In addition, faked products may harm the end consumer. For instance, in the pharmacy or the automotive industry, the use of fake products may end up in fatalities.

Most available grey market and counterfeit protection mechanism and processes to date have flaws. Thus, there is a need for a new, improved and reliable method for grey market and counterfeit detection and prevention.

BRIEF SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In one exemplary embodiment, a hidden product certificate is provided, which contains a unique product code identifying the physical item and which is packaged with the product inside the package or covered with an additional label or coating in the case where the product is shipped without a package.

Only the end customer can do the check after buying the product. The code is sent to a web platform that tests if the code was checked before and informs the end customer and the manufacturer if that is the case. Thus, an advantage is that the user can, quickly, easily and reliably, verify the authenticity of the product purchased.

After the check, the manufacturer can, through the platform, get in contact with all the end customers that had a check with the same code, indemnify them depending on its marketing strategy (e.g., replace the counterfeit products they bought or reimburse them) and clean the local market from any additional counterfeits. Thus, another advantage is that it allows for fast response from the manufacturer in order to effectively and efficiently combat counterfeiting.

The end customer is automatically registered in the web platform while performing the check. Thus, another advantage is that it allows avoiding App-phishing when using a mobile phone application to perform the check.

A product/brand community, based on social media around the product/brand being checked, is also provided. Thus, another advantage is that network externalities will be generated (due to the multiplier effect of the product/brand communities), which will amplify the effectiveness of the manufacturer's efforts for combating counterfeiting and grey markets.

The above embodiments and advantages, as well as other embodiments and advantages, will become apparent from the ensuing description and accompanying drawings.

BRIEF DESCRIPTION OF THE DRAWINGS

For exemplification purposes, and not for limitation purposes, embodiments of the invention are illustrated in the figures of the accompanying drawings, in which.

DETAILED DESCRIPTION OF THE PREFERRED EMBODIMENTS

Figure 1:
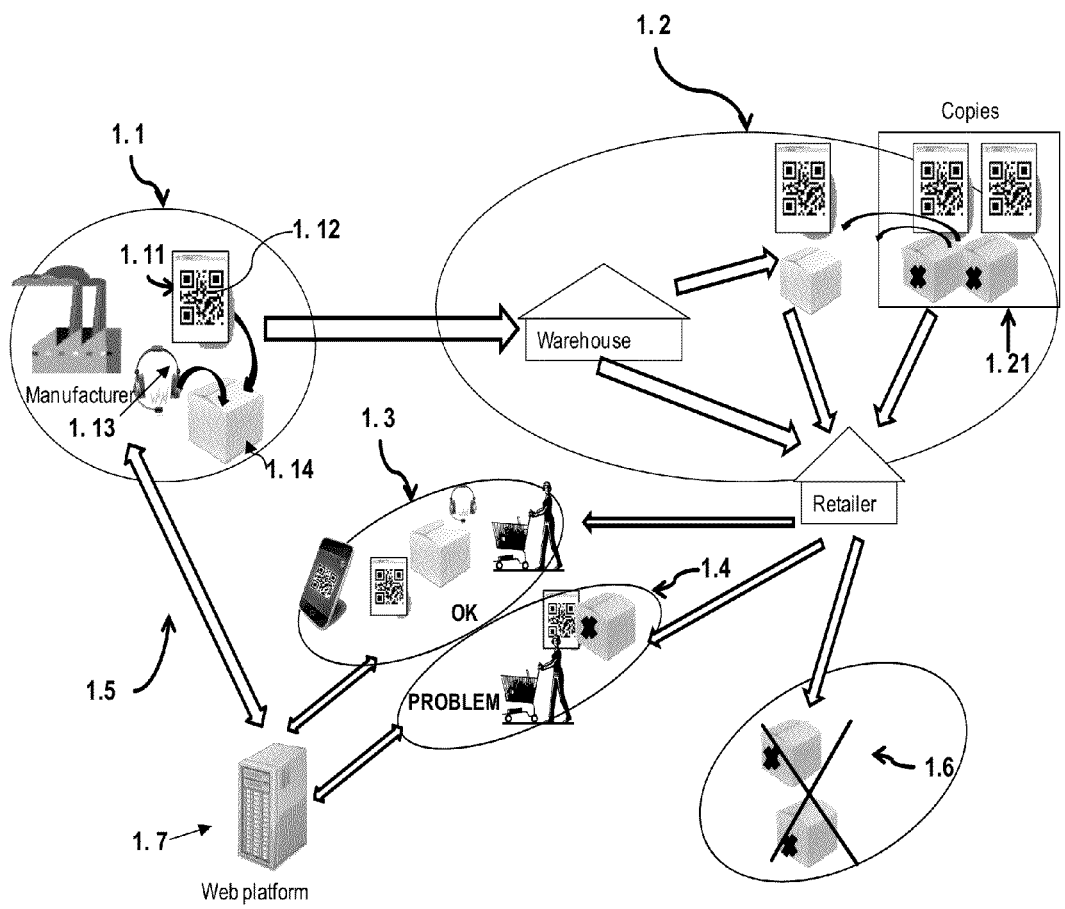
FIG. 1 is a schematic view of the counterfeit and grey market combating system and process, according to an embodiment.

What follows is a detailed description of the preferred embodiments of the invention in which the invention may be practiced. Reference will be made to the attached drawings, and the information included in the drawings is part of this detailed description.

The specific preferred embodiments of the invention, which will be described herein, are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

Referring now to FIG. 1, a schematic view of the counterfeit and grey market combating system and process, according to an embodiment, is shown. For every physical form of the product (i.e., every unit) being produced, (e.g., a headset 1.13), as opposed to its virtual or abstract representation in, for example the ERP Systems (Enterprise Resource Planning Systems), a Unique Identifier (UID) 1.12 is, preferably, generated. This may be accomplished by, for example, setting for every manufacturer using the counterfeit and grey market combating system, a secure access to a web server/web platform 1.7 schematically depicted in FIG. 1, including a central database and appropriate software, via a secure communication link 1.5.

Each manufacturer may be able to securely access the web platform 1.7 using its own computer(s) (not shown) on which a computer application, specifically configured for this purpose, may be installed. Thus, it should be apparent that more than one manufacturer may use the same web platform 1.7 (i.e., shared web platform), which may be owned and/or operated by a third party. This arrangement may have obvious cost advantages. Alternatively, a manufacturer may own, operate, administer and/or maintain its own web platform 1.7.

Next, a worker in the production line may connect securely via the communication link 1.5 to the web platform 1.7 and uses the web platform's modules to generate the UIDs 1.12 in real time and parallel to the produced products 1.13, and to print the certificates 1.11 that contain the UIDs 1.12 (shown here as QR code) and other information desired by the manufacturer. Next, the same worker, another worker, or a machine packages with every product item 1.13 a printed certificate 1.11 in box 1.14.

The UIDs 1.12 are kept saved in the central database which is part of the web platform 1.7 to be able to check for their existence and number of times they were checked when the end-customer buys the product and performs the check (see section/module 1.3 of FIG. 1).

The printing of the certificates may be also performed in batches before (or after) the products are produced. And again, in addition to the UID 1.12, the certificate 1.11 can contain promotional or marketing information, depending on the marketing and customer support strategy of the manufacturer, or other information wanted by the manufacturer (e.g., manufacturer's logo). The web platform 1.7 may be configured to provide applications that enable each manufacturer using the platform to customize their certificates in terms of the UID format, the information contained, the certificate's design features and/or color scheme, and so on.

Before packaging the certificate 1.11 with the product, the worker may associate the UID 1.12 with the serial number of the product being packaged by, for example, scanning the QR code of the UID 1.12 from the certificate 1.11 and the barcode (not shown) of the serial number on the product 1.13. The web platform 1.7 may be equipped with an application that provides the necessary functionalities to do this association.

The web platform 1.7 may also be configured to integrate to the ERP System of the manufacturer and synchronize the association of the UIDs with the serial numbers, so that no scanning by the worker would be needed. This association of the UIDs with the serial numbers is optional. It may be done such as when the manufacturer wants to be able to track and trace back the product. For example, if a counterfeit was detected, or if the manufacturer has a warranty issue with a product, using the UID the manufacturer knows from the web platform 1.7, which customer purchased the product, where and when he bought the product, and, from the associated serial number, he can know in which production facility and when the product was produced, and which distribution channel(s) it followed. Also to check if a product is sold in the predestinated local market or not. If not, then it is a grey market. In this case the manufacturer can contact back the end customer, ask for the retailer he bought the product from and track back the distribution channel for a possible grey market distributor It should be understood that the UID 1.12 may be printed as plain text and/or as barcode (1*d* or 2*d*), preferably, in a certificate 1.11 which may contain additional information (e.g., warranty information) wanted by the manufacturer. As explained above, the certificate 1.11 may then be packaged together with the product 1.13 in the package 1.14. If the product is shipped without package (e.g., textiles or clothing), then the UID 1.12 may be printed on a tag and is, preferably, protected from being read with an additional label or coating (e.g., scratchable coating) or the like, and bound or attached to the non-packaged product. The UID 1.12 may also be written in a radio-frequency identification tag (RFID), that is, preferably, protected from being read, such as by using Aluminum foil or other suitable material, before the product is sold to the end customer. Only the end customer may, preferably, read the UID 1.12, after purchasing the product, as it will be explained below.

Figure 2A:
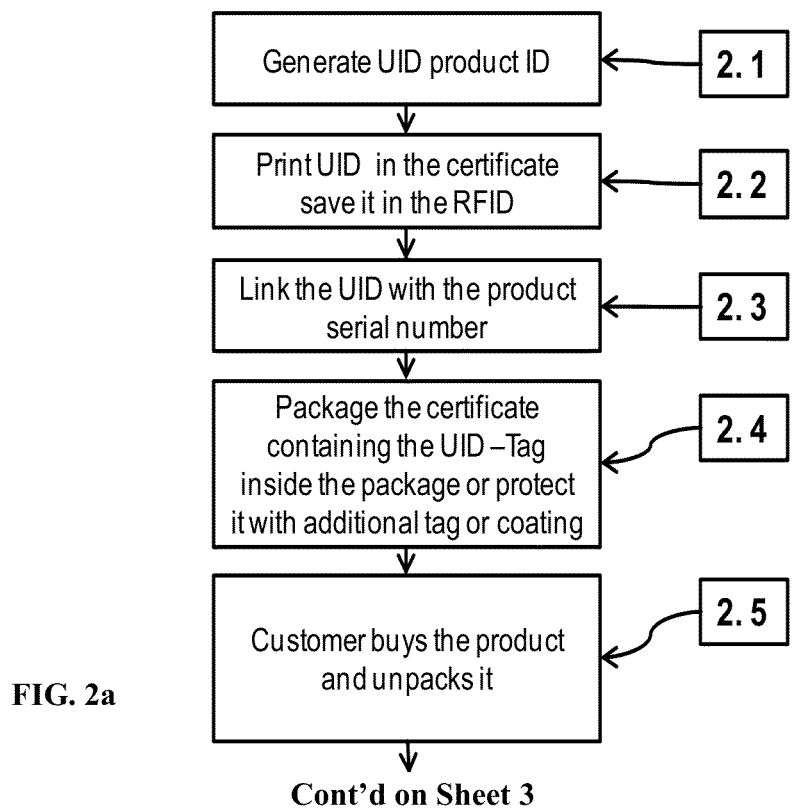
FIGS. 2*a*-*c* illustrate a flowchart depicting the exemplary steps of the counterfeit and grey market combating method, according to an embodiment.
Figure 2B:
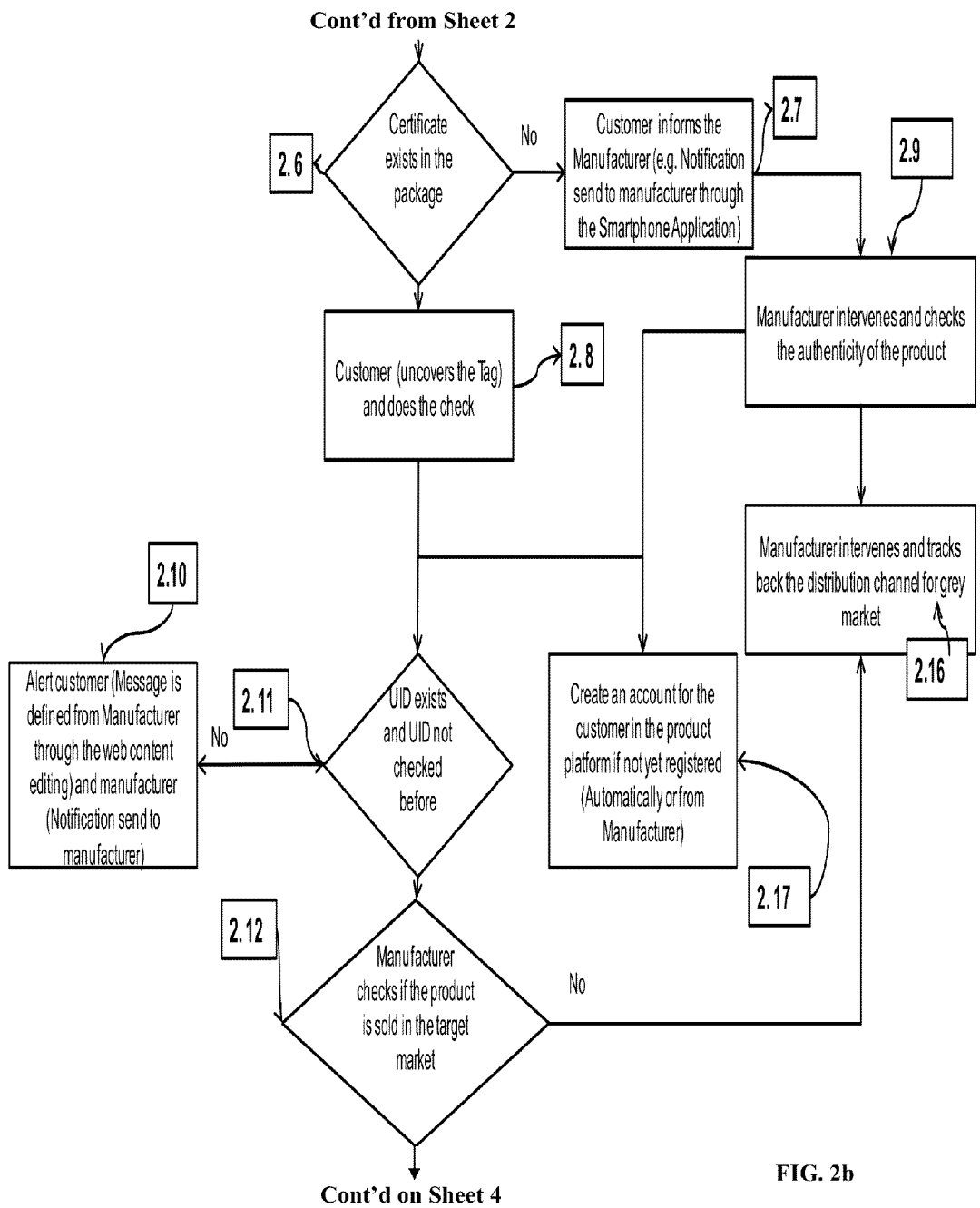
Figure 2C:
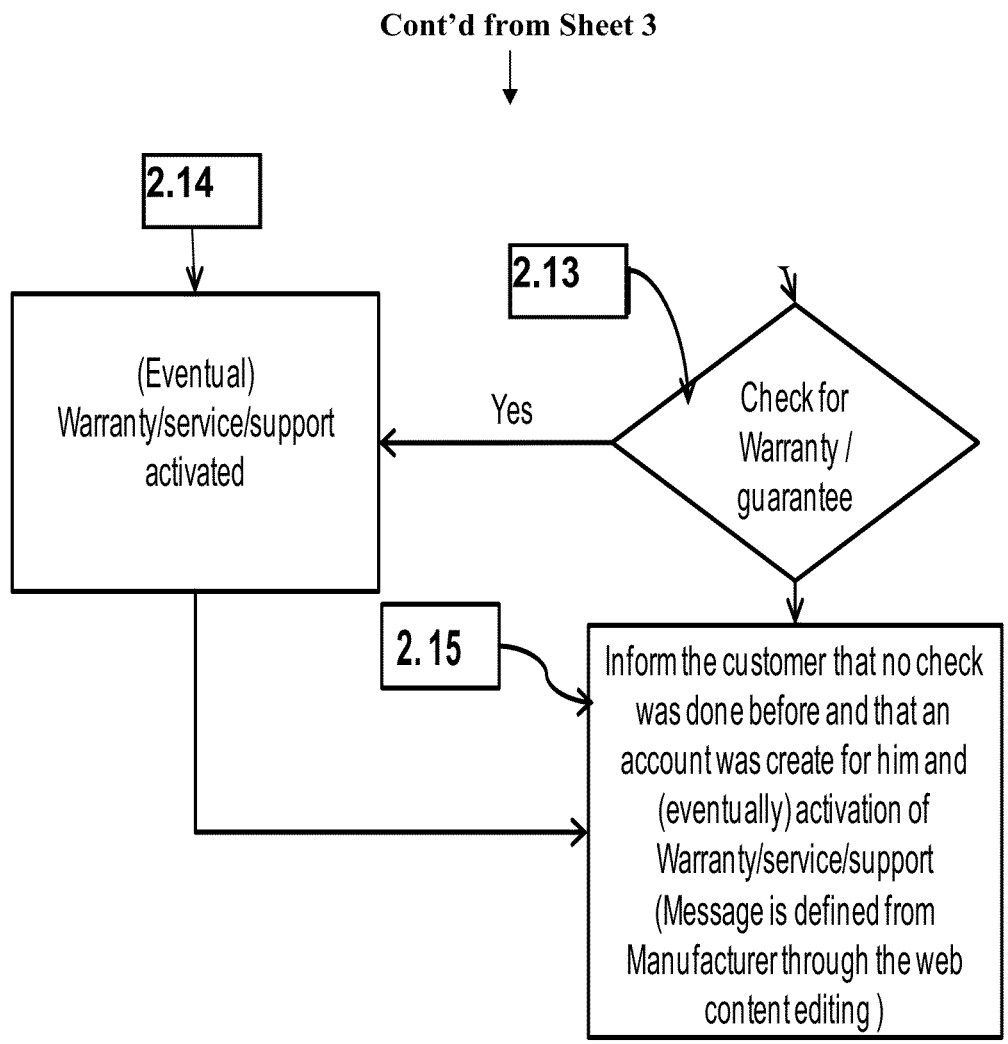

Referring now to FIGS. 2*a-c*, a flowchart depicting the exemplary steps of the counterfeit and grey market combating method, according to an embodiment, is shown. Steps 2.1 to 2.4 in FIG. 2*a* describe what is schematized in section/module 1.1 of FIG. 1. Again, for every physical item of the product being produced, a Unique Identifier (UID) may be generated in parallel. This UID may be printed as plain text or as a barcode (1*d* or 2*d*) in a certificate which may contain additional information wanted from the manufacturer. The certificate (1.11 in FIG. 1) may then be packaged together with the product in the package. If the product is shipped without package (e.g., textiles or clothing), then the UID may be printed in a tag and is, preferably, protected from being read with an additional label or coating and bound to the product. The UID may be also written in an RFID that is protected from being read such that only the end customer can read it. In step 2.3 (and section 1.1 of FIG. 1) the UID may be associated with the serial number of the physical product being produced. This allows tracing back the product being checked from the end customer (e.g., for warranty or quality issues and possible grey market issues).

During one of its distribution nodes, the product package could be stolen (see section 1.2 in FIG. 1) and the certificate could be duplicated and packaged with counterfeited products (1.21 in FIG. 1). The new counterfeits could be injected again in the distribution channels (see 1.6 in FIG. 1). In step 2.5 of FIG. 2*a* (and 1.3/1.4 in FIG. 1), the customer unpacks the products and checks if the certificate is packaged with it.

The certificate could be absent from the package (or the tag missing in the case of unpacked products). This could mean that it was removed intentionally from the package by, for example, a grey market distributor or it can be just a counterfeit product (Step 2.6, FIG. 2*b*). In this case, the customer may use an application in her smart mobile phone ("smart phone application"), which was programmed to work with the web platform 1.7 (FIG. 1), to inform/alert the manufacturer (Step 2.7, FIG. 2*b*; 1.4, FIG. 1) about the missing certificate. Additional information may be sent to the manufacturer by the customer through the smart phone application, such as customer's mobile phone number, her location, and/or location where the product was purchased. For simplicity of use, in the smart phone application there may be just a specially configured button for this purpose, such as when clicked, the button sends a standard alarm/alert to the manufacturer and/or all or some of the additional information mentioned above, such as the customer's phone number. The alert and information may be also sent through SMS, or other similar communication services, directly from the smart phone application.

Alternatively or concurrently, the customer may be given the option to connect directly to the web platform 1.7 (FIG. 1) via a web interface and, for example, enter the information in a web form. This option may be particularly useful when, for example, the customer can't use a smart mobile phone but she can use a computer with web/internet access.

Once informed by the customer, the manufacturer may intervene by checking the authenticity of the product (Step 2.9, FIG. 2*b*) and/or registering the user (Step 2.17, FIG. 2) in its respective social media based product community of the web platform, which will be described later herein. Further, the manufacturer, using the information collected from the customer, which may include the product's serial number, may be able to track back the distribution channel to uncover what and/or who caused the removal of the certificate (Step 2.16, FIG. 2*b*).

Figure 2D:
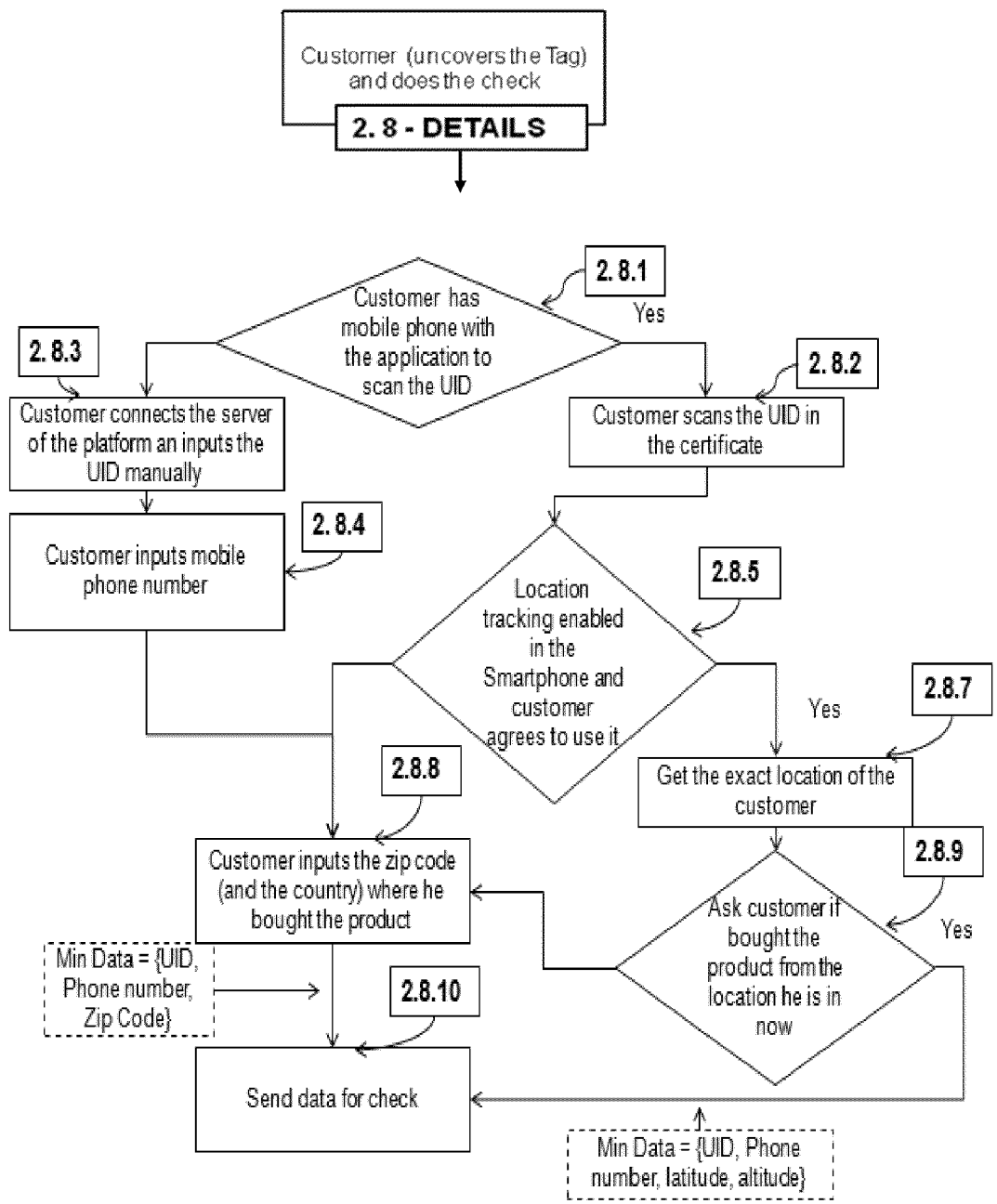
FIG. 2*d* shows the details regarding step 2.8 from FIG. 2*b*.

If the certificate is still within the package, then the customer locates the UID (or uncovers the tag in the case of unpacked products; see Step 2.8, FIG. 2*b*; FIG. 2*d* shows the details regarding step 2.8 from FIG. 2*b*). Next, the customer scans the UID using a scanning device, preferably a smart mobile phone (see Steps 2.8.1-2.8.2, FIG. 2*d*), having installed in it an application ("smart phone application"), which was programmed to work with the web platform 1.7 (FIG. 1).

As shown in FIG. 2*d*, the smart phone application may be programmed to track the location of the smart phone, and thus, of the customer (Steps 2.8.5 and 2.8.7). The location tracking capability is preferably enabled only if the customer agrees to it. Next, the smart phone application may be programmed to ask the customer for the location from where she bought the product (e.g., zip code and/or country, Step 2.8.9). This is to treat the case where the customer buys the product in a location (or a country, e.g., USA) and unpacks it in a different location (or a country, e.g., Germany). In this case it would be, of course, an error to just use the location obtained from the smart phone.

Next, the smart phone application sends the data for check (Step 2.8.10) to the server/web platform (1.7, FIG. 1) for check. As shown, in FIG. 2*d*, the minimum set of data sent by the smart phone application is the UID, phone number, and location data (e.g., latitude and altitude). Of course, other information such as price could be asked and sent, depending, for example, on the willingness of the customer. The data may be sent, from the smart phone to the web platform, through internet, short messaging service—SMS (e.g., when internet is not available), or through other communication means.

Alternatively or concurrently, the end customer may also be presented with the option to input manually (Step 2.8.3, FIG. 2*d*) the value of the UID directly into the server/web platform 1.7 via a web interface, which may be made available to the customer through any device capable of running a web browser. If this route is selected or used, next, the customer will preferably be asked to input her phone number (e.g., mobile phone number; Step 2.8.4). Next, the customer will preferably be asked to input the zip code and/or the country where she bought the product (Step 2.8.8). Thus, if this route is selected or used, the minimum set of data collected and sent for check (Step 2.8.10) is the UID, the phone number and the zip code and/or the country where the customer purchased the product.

Optionally, the manufacturer may also decide to couple the activation of the warranty (or service or support) with the check of the product authenticity (Steps 2.14 and 2.13, FIG. 2*c*).

In step 2.17, FIG. 2*b*, (and 1.3, 1.4, FIG. 1), during or after the scanning of the UID, the end customer will be automatically registered in the web platform. Through this registration, the customer becomes a member in the product community (described later herein) that, preferably, is part of the web platform. For this purpose (i.e., automatic registration), the least set of information that will be preferably collected from the customer as described above, are the customer's mobile phone number and the location where he bought the product.

The mobile phone number will preferably be used as a temporary login. The customer may be allowed to login with this number and with a random/temporary password that may be sent back to her as part of the feedback to the check. The customer may then login later and replace her phone number and the temporary password with a real login and complete her profile in the platform. This, of course, may be done if she hasn't already an account there.

The customer may also be offered the option associate this created account with her Facebook, Google+ and the like accounts, as there are already internet standards that allow this association to be accomplished. This would reduce for him the burden of creating many accounts in different platforms and reduce the barrier for him to use this product community platform.

The location where the customer purchased the product, which may or may not be the same as the customer's location at the time she does the authenticity check, is also needed in order to be able to narrow down the source of counterfeit or grey market. Depending on the customer agreement regarding data privacy, the exact location of the customer may be sent automatically (if location tracking is enabled in her smart phone) and then the customer may be asked to confirm that she purchased the product from that location, or, the customer may just be asked where she purchased the product.

The automatic registration may be done regardless of the fact that the customer has an original or a counterfeit product. She bought the product and is interested in his originality. Therefore, she could be also interested in being part of the product/brand's community. It is up to the customer to log in later and use the functionalities of the community. The customer may also be given the option to refuse being registered in the community or to delete her account if one was created. However, accessing the product community via a login interface in the secured web platform, which is protected and certified via SSL, the end customer ensures that she is doing the check using the web server of the issuer of the certificate (and therefore of the UID) and not a phishing one. This is important especially when using a mobile phone application to perform the check.

Upon the UID check performed by the customer (Step 2.8 FIG. 2*b*), the following are the possible results:

The UID exists and is being checked for the first time (see section 1.3 in FIG. 1 and Step 2.11 in FIG. 2*b*). If that is the case, then steps 2.12, 2.13, 2.14 (if applicable), 2.15 and 2.16 (if applicable), as shown and described in FIGS. 2*b*-*c*, will be followed);

The UID exists but was not checked for the first time (see 1.4 in FIG. 1 and Step 2.10 in FIG. 2*b*). Thus, in this case the customer will be alerted and the manufacturer notified. All the customers that checked with the same UID may be contacted back by the manufacturer, and the authentic UID may be investigated. Furthermore, the customers owning the counterfeits may be indemnified by the manufacturer.

The UID doesn't exist (1.4 in FIG. 1, Step 2.10 in FIG. 2*b*). Similarly, in this case also, the customer will be alerted and the manufacturer notified.

The end customer gets the appropriate response that the manufacturer already defined through the content management system of the web platform (Step 2.15, FIG. 2*c* or Step 2.10 in FIG. 2*b*). This configuration of the web platform, wherein the manufacturer has control over the feedback message(s) the customer receives, allows the manufacturer to have higher flexibility dealing with different situations. For example, this feedback may be an alarm to the end customer telling her to go to a special customer service to check the authenticity of the product and eventually being indemnified. If the UID check was not done before, the feedback may be just an acknowledgement that no check was done before, and thus, for example, that the product is likely genuine, plus promotional or marketing messages, depending on the manufacturer's marketing strategy. This feedback may be sent through internet, SMS, or the like, and it may be sent directly from the web platform.

The manufacturer may use statistical analysis of all the detected counterfeit to identify the hot spots in the local market. The same can be done also for grey market products, assuming that the manufacturer coupled the UID with the product serial number while generating and packaging the certificate. The manufacturer may then intervene and clear up the local market from other potential counterfeits and/or grey market products that are not yet bought by end customers. Furthermore, the data gained through the web platform may be used for business intelligence to perform a geographical and time scoped statistical analysis to identify the origin and distribution routes of counterfeits and/or grey market products and take the appropriate actions before the counterfeits and/or the grey market products are bought by the end customers.

It should be noted that, if the UID was associated with the serial number of the product, when the end-customer performs the product authenticity check (i.e., UID check), the manufacturer may in parallel check in his ERP or logistics system if the product was sold in the predestinated distribution region. If it was not, the manufacturer may then contact the end customer, ask her from which retailer she bought the product, contact the retailer and trace back the product distribution until the grey market responsible is identified.

Some of the users of the web platform, such as retailers, customs officers, designated employees of the manufacturer (e.g., from the counterfeit department) or agents of the manufacturer, may be granted a special role/access to perform the UID check without marking the UID as checked by the end customer. This special role assignment will be preferably managed by the manufacturer itself, since the manufacturer will normally be the administrator of the product community in the web platform, and thus, from the web platform, it may assign different roles to the users of the web platform who may also be members of the product community.

The assignment of this special role to, for example, a retailer, may provide the manufacturer with an additional tool for combating product counterfeiting and/or grey markets. For example, a retailer may use the special access role to check the UID of a few randomly selected product units from a container or a lot of product units before, for example, accepting the container/lot from a distributor.

It should be understood, however, that extra precaution must be taken in handling the special access credentials in order to prevent the creation of a security hole in the system. Careless handling of these credentials may compromise the system/web platform, such as when a counterfeiter steals the credentials of one of these special accounts and exploits them.

Figure 3:
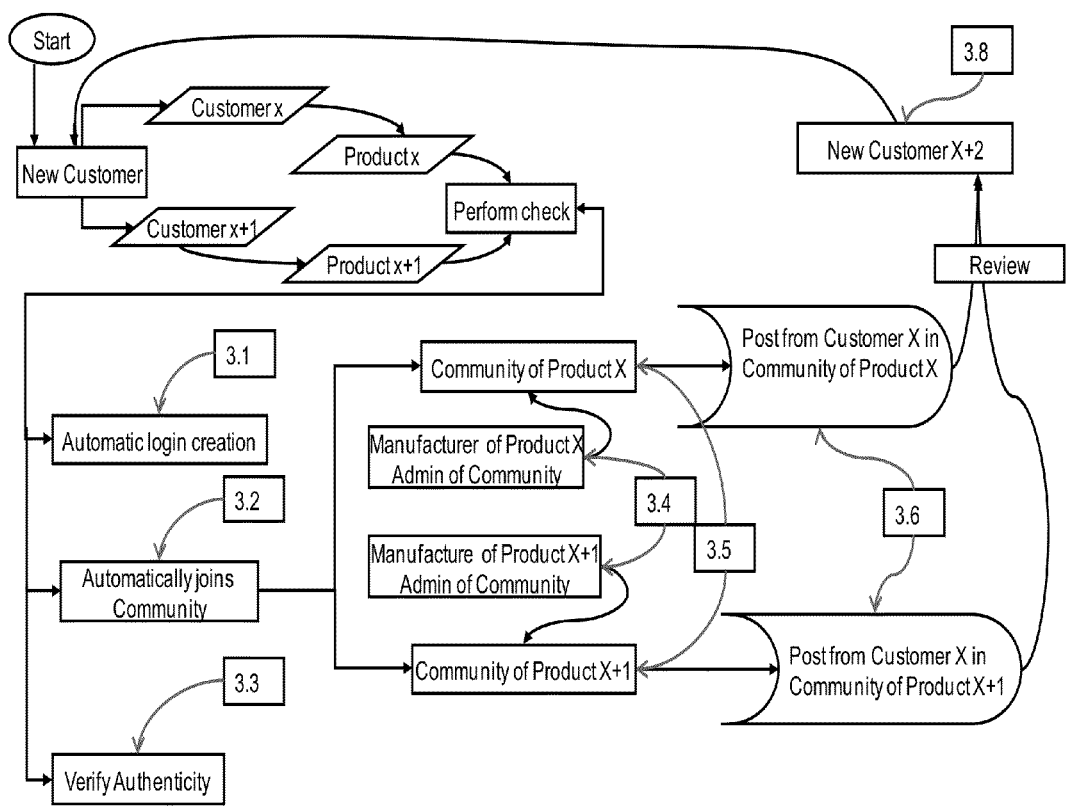
FIG. 3 is an extension of FIGS. 2*a*-*c* to explain the use of the social media aspect for the specific purpose of combating counterfeit and grey market, according to an embodiment.

Referring now to FIG. 3, which is an extension of FIGS. 2*a-c*, it is explained therein how the social media aspect may be used for the specific purpose of combating counterfeit and grey market, according to an embodiment. As shown in FIG. 3, and as described in more details above when referring to FIGS. 2*a-c*, (Steps 2.5 to 2.17), while the end-customer performs the authenticity check, two actions may be triggered. First, the verification process is started, which will verify the authenticity of the product (Step 3.3, FIG. 3). And second, as shown in Steps 3.1-3.2, FIG. 3, in order to be able to make use of the multiplier effect of the product/brand communities, and increase the efficacy and efficiency of the presented method, as soon as a customer performs the authenticity check, an account is generated automatically for her in the web platform, if one is not already existing. Through this registration, the customer becomes a member in the product community that, preferably, is part of the web platform. Thus, she becomes automatically a member of the community of the product she purchased (Step 3.5, FIG. 3). The consumers can then login into the web platform and interact with others in the product/brand communities where she is already a member.

Every product/brand community has, preferably, its own social media website inside the web platform (1.7, FIG. 1) and is, preferably, administrated by the manufacturer of the respective product/brand or by its agent (Step 3.4, FIG. 3). Thus, the web platform may become a social media product platform: a web platform for verifying authenticity combined with an online product/brand community that may help combating counterfeit and grey markets as it will be explained below.

Some of the actions that may be performed in product/brand communities (Steps 3.5, 3.6, 3.8, FIG. 3), to help combating counterfeits and grey markets, are: posting hints/suggestions/advices from manufacturer to end customers and/or from end customers to end customers how to identify counterfeits (this may be achieved through blogs, podcast, videos, and so on, posted in the product community); alerting other users in the neighborhood of one customer about a possible counterfeit source (e.g., retailer name and location (physical and/or online)), possible characteristics to identify the potential counterfeit (the manufacturer may intervene and confirm it/reject it and/or add additional hints and suggestions how to avoid it, whom to contact and so on); publishing, by the manufacturer, of a list of locations/retailers/channels (e.g., internet retailers) where the customer should be extra careful when buying the product. Once this information is posted, it is available to existing and/or new/potential customers (Step 3.8, FIG. 3), who, for example, after reviewing the information, may decide to not purchase from a retailer identified as a counterfeit source. Hence, this process may contribute to combating counterfeit.

Additional actions which may be performed in the product/brand communities (Steps 3.5, 3.6, FIG. 3) are: communication and support between manufacturer and customer, namely direct contact from customer to manufacturer for issues regarding the purchased product, since, if allowed by the customer due to data privacy, the manufacturer will know product's serial number, where and when it was produced, when and where it was bought, and so on, and can therefore propose/provide warranty, usage, manual, booklet, updates, additional software, and other such specific information, support, and/or services; information exchange around the product/brand among customers and between customer and manufacturer (i.e., WOM (Word of Mouth) through blog, chat, forums and the like); videocast, podcasts, tweets and messaging and so on regarding customer's experience with the product, improvement suggestions to the manufacturer, and so on; actions, promotions, games, challenges proposed by manufacturer; events, new models and innovations announcements from manufacturer around the product; and, direct communication with the manufacturer for warranty/service issues.

It should be noted that the manufacturer may decide, depending on its marketing and/or customer service strategy, whether or not to open the product community to the public (i.e., no product purchase and check to be needed in order to become a member of the community), or only to members in other product/brand communities in the platform, or narrow it to only customers who bought the product and did the check, to name just a few possibilities. Opening the product community to the public or partially to users of the platform would likely lead to a virtuous circle, due to the multiplier effect of the communities, generating network externalities to bring more and more users into the system. This may enable the manufacturer to locate the counterfeits with more accuracy and avoid them, since the number of product community users will continuously increase and represent a substantial part of the manufacturer's customer base (Steps 3.8, FIG. 3).

It should be understood that, in addition to the authenticity check functionality, all the social media functions that the user can perform in his product community, can be also performed via the smart phone application described earlier.

Figure 4A:
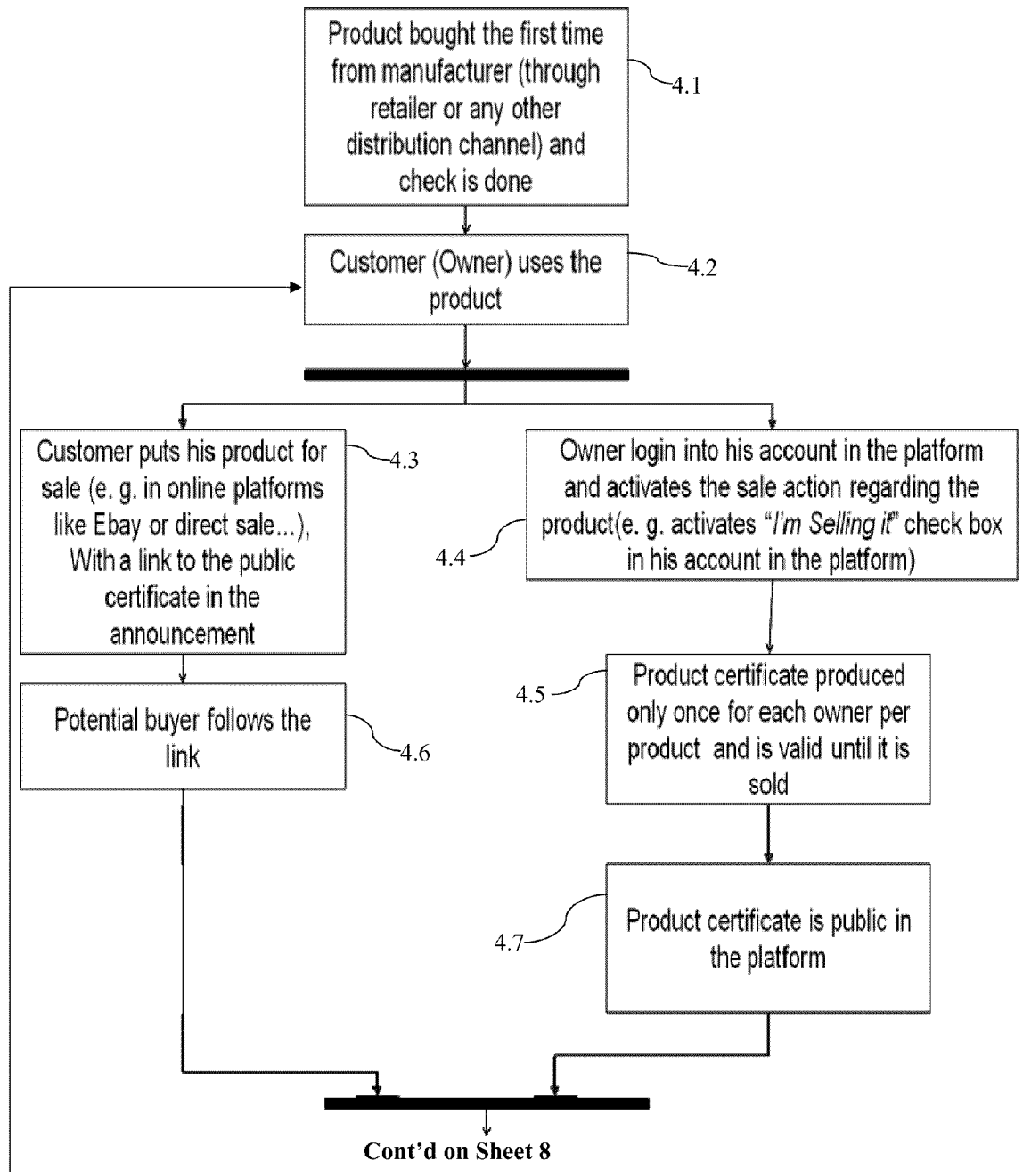
FIGS. 4*a*-*b* illustrate a flowchart depicting the exemplary steps of the second hand market aspect of the counterfeit and grey market combating method, according to an embodiment.
Figure 4B:
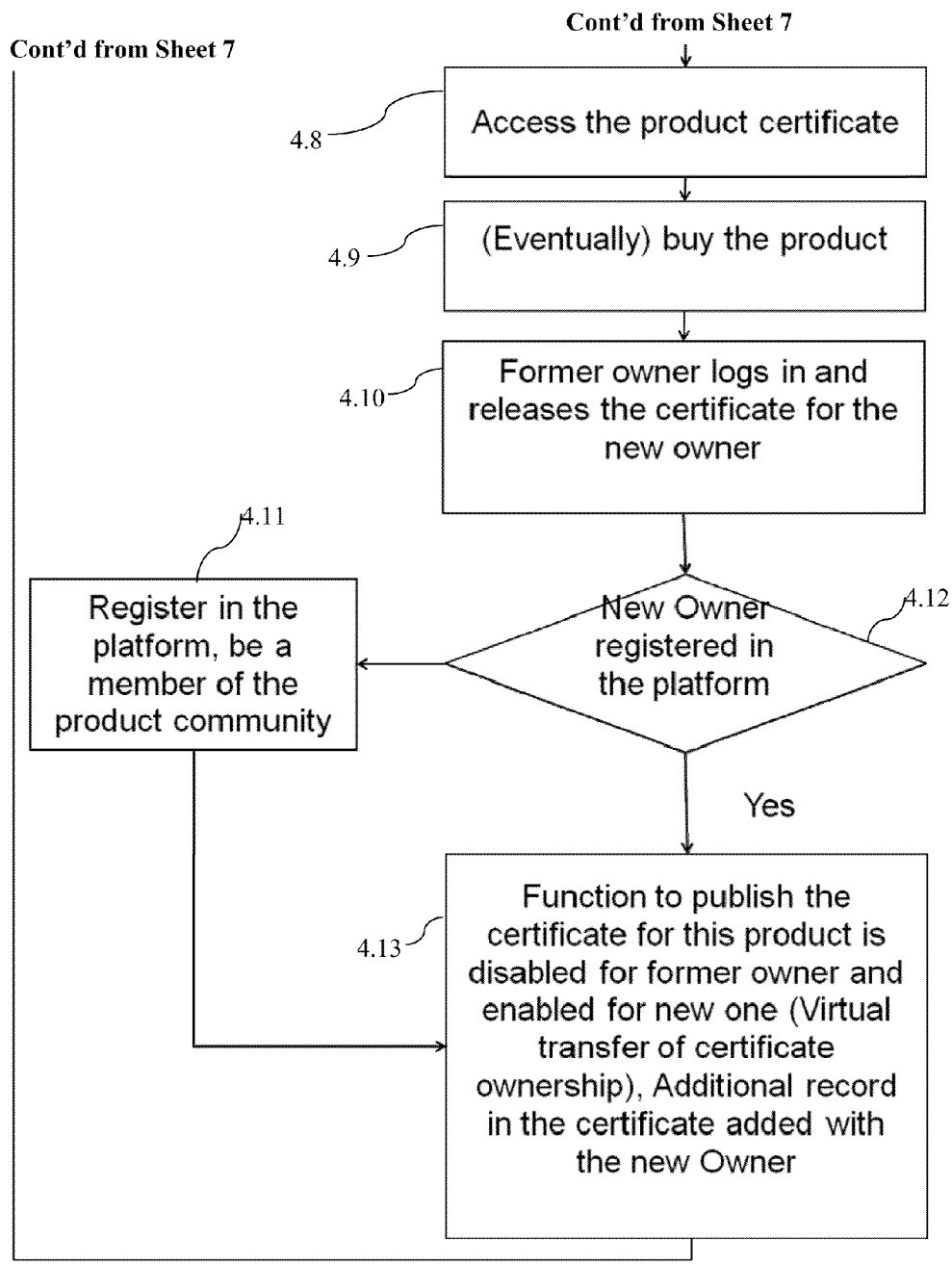

FIGS. 4*a-b* illustrate a flowchart depicting the exemplary steps of the second hand market aspect of the counterfeit and grey market combating method, according to an embodiment. It should be recognized that additional incentives for the end-customers to encourage them to use the web platform, will likely increase the efficacy of the counterfeit and grey market combating method. There are obvious inherent incentives to use the web platform, like checking the authenticity of the purchased product, or the incentives that can be provided by the manufacturer, like the activation of the warranty/service, discounts, coupons and so on. However, these inherent incentives may, unfortunately, not be enough to get a high number of customers to use the platform, and thus, achieve the critical scale to make use of the network effect. That's why, additional incentives may need to be included. For example, a second hand market component may be added to the web platform.

From the manufacturer, the information about the product characteristics, such as model, color, weight and so on, and the production information such as date, time, location and so on, are known. The identity of the first customer, the one who unpackaged the product and checked for authenticity (Step 4.1, FIG. 4*a*), through his account and mobile phone number (mobile phone number is enough for identification since they are even used for online banking nowadays), is also known. The time and location the first customer purchased the product is known as well.

Figure 4C:
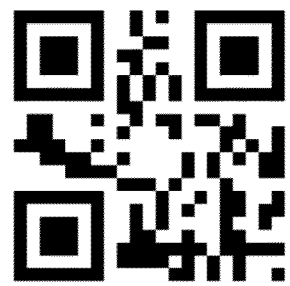
FIG. 4*c* illustrates a sample of a product certificate for the second market.

After using the product for a while (Step 4.2, FIG. 4*a*), the first customer may want to sell the product. The web platform may be configured to allow the customer to log in his account, and once there, to activate the sale of the product (Step 4.4, FIG. 4*a*), and generate the product certificate (Step 4.5, FIG. 4*a*), which may be made public in the platform (Step 4.7, FIG. 4*a*). A sample of product certificate is shown in FIG. 4*c*.

The web platform may be configured to handle the entire sale transaction. The customer may also choose to sell her product through normal second hand channels online (e.g., Ebay; Step 4.3, FIG. 4*a*) or through other online or offline means. While doing so, she may create a QR-Code containing the link to the product certificate which may then be scanned using a smartphone. The web platform may be configured to generate the QR-Code for the user, or other means may be used. It should be apparent that, when the customer chooses to sell the product through online platforms, a link may be used instead of the QR-Code, which may be followed by potential buyers (Step 4.6, FIG. 4*a*) to access the product certificate, and thus, learn more about the product.

Thus, a potential buyer can scan a QR code or, alternatively, click a link to access and see the product certificate (Step 4.8, FIG. 4*b*). If the potential buyer actually buys the product (Step 4.9, FIG. 4*b*), he should, preferably, register in the web platform (Step 4.11, FIG. 4*a*), if not already registered (Step 4.12, FIG. 4*a*). The former owner may release the certificate to the buyer's account (Step 4.10, FIG. 4*b*). This means that the function of publishing the product certificate of this product in the platform is disabled for the former owner and enabled for the new owner (Step 4.13, FIG. 4*a*). In addition, a new record is added to the list of owners in the certificate.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the invention. Therefore, the scope of this application is intended to cover alternate embodiments and/or equivalent variations of the specific embodiments illustrated and/or described herein. Hence, the scope of the invention is defined by the accompanying claims and their equivalents. Furthermore, each and every claim is incorporated as further disclosure into the specification and the claims are embodiment(s) of the invention.

What is claimed is:

1. A processor-based method for combating counterfeiting and gray market, comprising the steps of: accessing, via a secure communication link, a web platform comprising a network-connected server on which software that provides functionalities for the method executes; generating, using the web platform, a unique identifier ("UID") for every product unit being produced by a manufacturer; saving the UID in a database that is part of the web platform; communicating the UID to the manufacturer; associating the UID with a product unit such that the UID is physically hidden; verifying the authenticity of the UID, after the UID was uncovered and sent to the web platform using a device capable of communication with the web platform by a third party who received the product unit; automatically registering the third party in the manufacturer's product community, which is a social media based community comprising members who previously received a product unit and sent its UID to the web platform; and, sending a message from the web platform to the third party's device indicating whether or not the verified UID is authentic.

2. The method of claim 1, wherein the UID is included in a product certificate printed by the manufacturer from the web platform.

3. The method of claim 1, wherein the UID is at least one member of a group consisting of a barcode and a QR code and said device is a smartphone with scanning capability and having a smartphone application programmed to work with the web platform.

4. The method of claim 3, wherein the automatically registering the third party in the manufacturer's product community is performed by using the phone number associated with the smartphone as part of a temporary login.

5. The method of claim 3, wherein the location of the smartphone is tracked by the smartphone application and, together with the phone number and UID, is the minimum set of data sent to the web platform.

6. The method of claim 5, wherein the third party is asked to indicate whether or not she purchased the product unit at the location tracked by the smartphone application such that the error of assuming, by the smartphone application, that the product was purchased at the tracked location is prevented.

7. The method of claim 2, wherein the product certificate is customized by the manufacturer using the web platform, by including in the product certificate manufacturer's marketing material.

8. The method of claim 1, wherein the database is used to check for the existence of the UID and the number of times the UID was checked.

9. The method of claim 1, wherein the UID is associated with the serial number of the product unit and with the manufacturer's enterprise resource planning ("ERP") system for tracking the product and identifying counterfeit and grey market sources.

10. The method of claim 2, wherein the associating the UID with a product unit such that the UID is hidden is performed by physically packaging the printed product certificate, which includes the UID, together with the product unit in its package, and sealing the package such that an end customer may access the UID only after purchasing the product.

11. The method of claim 1, wherein the web platform allows the third party to communicate with the manufacturer when the UID is physically missing.

12. The method of claim 1, wherein the UID is considered at least temporarily authentic if it exists in the database and it is being checked for the first time.

13. The method of claim 1, wherein said message is predetermined by the manufacturer.

14. The method of claim 1, wherein the third party is an end customer who purchased the product unit, and wherein, upon the verification of the authenticity of the UID, the UID is marked as checked in the database.

15. The method of claim 1, wherein the third party is a member of a group consisting of manufacturer's employee, manufacturer's agent, retailer, and customs officer, who was granted a special access to the web platform to perform the UID verification, without causing the marking of the UID as checked in the database and without automatically registering her in the manufacturer's product community.

16. The method of claim 14, wherein, through information posted in the product community by the manufacturer and the end customers alert others about possible counterfeit sources, thus, making the product community effective in combating counterfeiting.

17. The method of claim 2, wherein the web platform is configured to provide the functionality of a second hand market by allowing a first buyer, who previously purchased and verified the product unit, to activate the sale of the product unit through the web platform, to make the product certificate public in the web platform such that it is viewable by prospective buyers, and upon completion of sale, to release the product certificate to the new owner who purchased the product unit from the first buyer, whereby the function of making the product certificate public is disabled for the first buyer and enabled for the new owner.

18. A system for combating counterfeiting and gray market, comprising at least one network-connected server with which at least one manufacturer, customers of the at least one manufacturer and third parties can be communicatively coupled, and software executing on the at least one network-connected server, such that the system is capable of: allowing access to it, via a secure communication link, for the purpose of using its functionalities; generating a unique identifier ("UID") for every product unit being produced by the at least one manufacturer; saving the UID in a database; communicating the UID to the at least one manufacturer for associating the UID with a product unit such that the UID is physically hidden; verifying the authenticity of the UID when the UID is sent to the system by a sender; when the sender is one of the customers of the at least one manufacturer, automatically registering the sender in the at least one manufacturer's product community, which is a social media based community comprising as members senders who previously sent a UID associated with the respective product to the system; and, sending a message to the UID sender indicating whether or not the verified UID is authentic.

19. The system of claim 18, wherein the sender of the UID is a member of a group consisting of manufacturer's employee, manufacturer's agent, retailer, and customs officer, who was granted a special access to the system to perform the UID verification without causing the marking of the UID as checked in the database.

20. The system of claim 18, wherein the system is configured to provide the functionality for supporting an online second hand market by allowing a first buyer, who previously purchased and verified the product unit to activate the sale of the product unit through the web platform, to make the product certificate public in the web platform such that it is viewable by prospective buyers, and upon completion of sale, to release the product certificate to the new owner who purchased the product unit from the first buyer, whereby the function of making the product certificate public is disabled for the first buyer and enabled for the new owner.

* * * * *